US012644505B2

(12) United States Patent
McLain et al.

(10) Patent No.: US 12,644,505 B2
(45) Date of Patent: *Jun. 2, 2026

(54) ADJUSTABLE STROKE DEVICE WITH CAM

(71) Applicant: Lake Country Tool, LLC, Oconomowoc, WI (US)

(72) Inventors: Scott S. McLain, Mukwonago, WI (US); Mark Snyker, Apple Valley, WI (US)

(73) Assignee: Lake Country Tool, LLC, Oconomowoc, WI (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/962,479

(22) Filed: Nov. 27, 2024

(65) Prior Publication Data

US 2025/0084914 A1 Mar. 13, 2025

Related U.S. Application Data

(63) Continuation of application No. 18/434,991, filed on Feb. 7, 2024, now Pat. No. 12,188,544, which is a
(Continued)

(51) Int. Cl.
*F16H 25/18* (2006.01)
*B24B 23/03* (2006.01)
(Continued)

(52) U.S. Cl.
CPC ............. *F16H 25/18* (2013.01); *B24B 23/03* (2013.01); *B24B 23/04* (2013.01); *B24B 41/042* (2013.01);
(Continued)

(58) Field of Classification Search
CPC . F16C 3/28; B24B 23/04; B24B 23/03; B24B 41/042; F16H 25/18
See application file for complete search history.

(56) References Cited

U.S. PATENT DOCUMENTS

| 169,753 | A | 11/1875 | White |
| 3,898,887 | A | 8/1975 | Grant |

(Continued)

FOREIGN PATENT DOCUMENTS

| CN | 206356999 | U | 7/2017 |
| DE | 102004055271 | A1 | 5/2006 |

(Continued)

OTHER PUBLICATIONS

European Search Report dated Mar. 26, 2019 in corresponding European Application No. 18203189.8.
(Continued)

*Primary Examiner* — Daniel Jeremy Leeds
(74) *Attorney, Agent, or Firm* — Harness, Dickey & Pierce, P.L.C.

(57) ABSTRACT

An adjustable stroke mechanism has a housing with a central axis and a wall enclosing a cavity. At least one counterweight is movably disposed within the cavity. A mounting assembly is disposed within the cavity. The mounting assembly has a workpiece attachment mechanism. A stroke adjustor couples the at least one counterweight with the mounting assembly. The stroke adjustor enables the counterweight and mounting assembly to move with respect to one another such that a distance between the counterweight and the mounting assembly is variably adjusted which, in turn, variably adjusts a stroke radius of the workpiece attachment mechanism with respect to the central axis of the housing.

10 Claims, 7 Drawing Sheets

Related U.S. Application Data continuation of application No. 18/302,158, filed on Apr. 18, 2023, now Pat. No. 11,927,250, which is a continuation of application No. 17/960,456, filed on Oct. 5, 2022, now Pat. No. 11,674,571, which is a continuation of application No. 16/171,974, filed on Oct. 26, 2018, now Pat. No. 11,493,115.

(60) Provisional application No. 62/578,797, filed on Oct. 30, 2017.

(51) Int. Cl.

| | |
|---|---|
| *B24B 23/04* | (2006.01) |
| *B24B 41/04* | (2006.01) |
| *B24B 47/12* | (2006.01) |
| *B25F 5/00* | (2006.01) |
| *B25F 5/02* | (2006.01) |
| *F16C 3/28* | (2006.01) |

(52) U.S. Cl.
CPC .............. *B24B 47/12* (2013.01); *B25F 5/001* (2013.01); *B25F 5/02* (2013.01); *F16C 3/28* (2013.01); *F16C 2322/39* (2013.01); *F16C 2322/50* (2013.01)

(56) References Cited

U.S. PATENT DOCUMENTS

| | | | |
|---|---|---|---|
| 4,328,718 | A | 5/1982 | Robinson et al. |
| 4,610,111 | A | 9/1986 | Cox |
| 5,020,281 | A | 6/1991 | Neff |
| 5,134,777 | A | 8/1992 | Meyer et al. |
| 5,879,228 | A | 3/1999 | Sun |
| 5,904,027 | A | 5/1999 | Bonde |
| 5,947,804 | A | 9/1999 | Fukinuki et al. |
| 6,062,960 | A | 5/2000 | Kai et al. |
| 6,089,065 | A | 7/2000 | Deriaz |
| 6,206,771 | B1 | 3/2001 | Lehman |
| 6,796,203 | B2 | 9/2004 | Dubrowskij |
| 7,238,095 | B1 | 7/2007 | Sun et al. |
| 7,241,209 | B2 | 7/2007 | Wiltshire |
| 8,740,669 | B2 | 6/2014 | McFadden et al. |
| 10,144,106 | B2 | 12/2018 | McLain et al. |
| 11,493,115 | B2 | 11/2022 | McLain et al. |
| 11,674,571 | B2 | 6/2023 | McLain et al. |
| 11,927,250 | B2 | 3/2024 | McLain et al. |
| 2004/0187324 | A1 | 9/2004 | James et al. |
| 2005/0090190 | A1 | 4/2005 | Rudolph |
| 2005/0197052 | A1 | 9/2005 | Lampka et al. |
| 2005/0245182 | A1 | 11/2005 | Deshpande et al. |
| 2006/0289264 | A1 | 12/2006 | Zhong |
| 2007/0224924 | A1 | 9/2007 | Hoglund |
| 2008/0057842 | A1 | 3/2008 | Lampka et al. |
| 2017/0120413 | A1 | 5/2017 | McLain et al. |
| 2018/0339396 | A1 | 11/2018 | Mclain et al. |
| 2019/0128392 | A1 | 5/2019 | Mclain et al. |
| 2020/0072292 | A1 | 3/2020 | McLain |
| 2022/0228653 | A1 | 7/2022 | McLain |
| 2024/0175482 | A1 | 5/2024 | Mclain et al. |

FOREIGN PATENT DOCUMENTS

| | | |
|---|---|---|
| EP | 0 157 532 A1 | 10/1985 |
| EP | 0272725 A2 | 6/1988 |
| EP | 0573916 A1 | 12/1993 |
| EP | 0 820 838 A1 | 1/1998 |
| EP | 1 688 217 A2 | 8/2006 |
| EP | 2072183 A1 | 6/2009 |
| EP | 2 127 808 A1 | 12/2009 |
| EP | 3162499 A2 | 5/2017 |
| EP | 3476538 A1 | 5/2019 |
| EP | 3693132 A1 | 8/2020 |
| GB | 2420518 A | 5/2006 |
| JP | 2001-179591 A | 7/2001 |
| WO | WO-99/21686 A1 | 5/1999 |

OTHER PUBLICATIONS

European Search Report dated Oct. 14, 2022 in corresponding European Application No. 22151499.5.
European Search Report dated Aug. 4, 2023 in corresponding European Application No. 23158102.6.

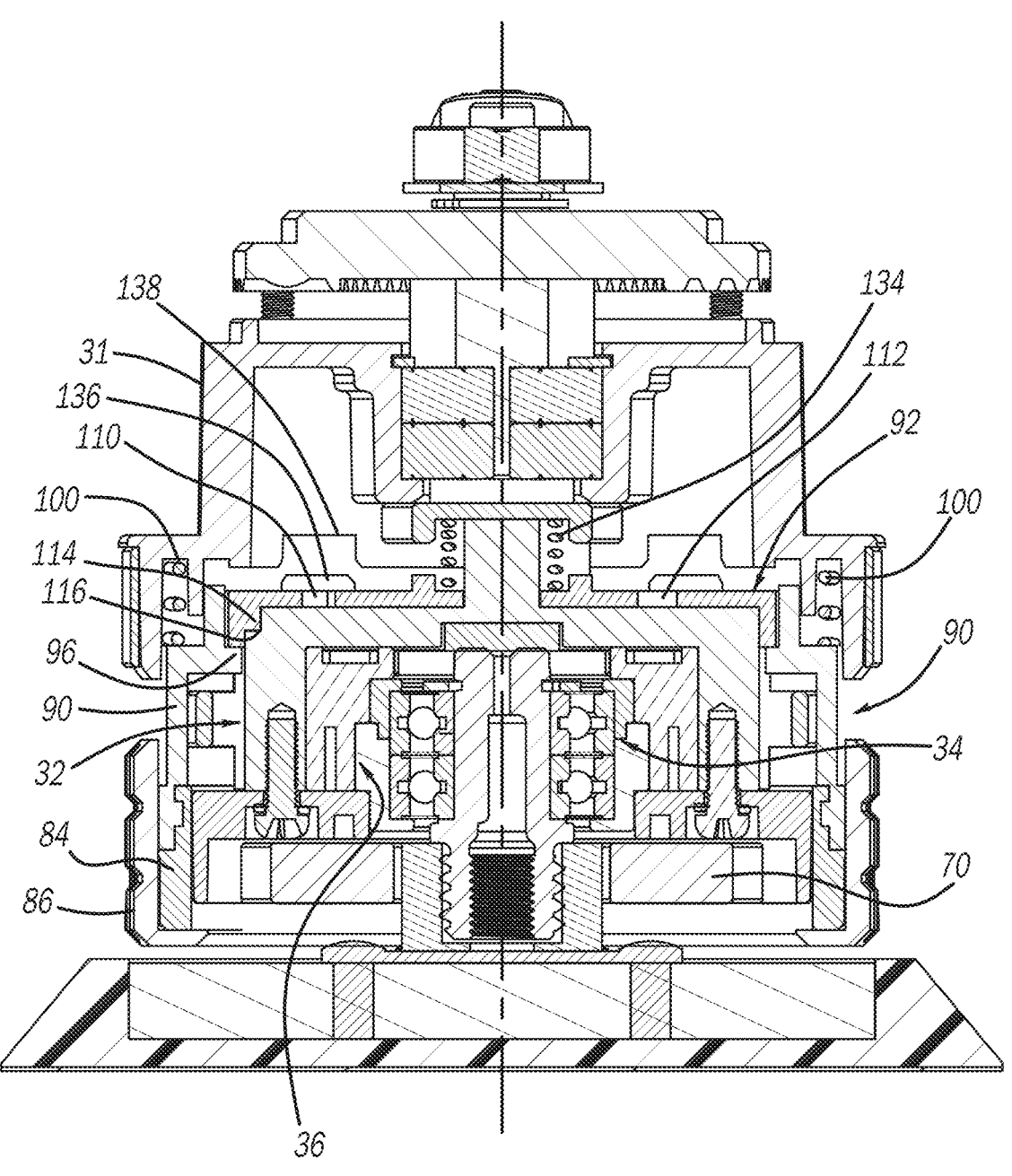
_FIG - 5_

ADJUSTABLE STROKE DEVICE WITH CAM

CROSS-REFERENCE TO RELATED APPLICATIONS

This application is a continuation of U.S. application Ser. No. 18/434,991, filed Feb. 7, 2024, which is a continuation of U.S. application Ser. No. 18/302,158, filed Apr. 18, 2023 (now U.S. Pat. No. 11,927,250), which is a continuation of U.S. application Ser. No. 17/960,456, filed Oct. 5, 2022 (now U.S. Pat. No. 11,674,571), which is a continuation of U.S. application Ser. No. 16/171,974 filed on Oct. 26, 2018 (now U.S. Pat. No. 11,493,115), which claims the benefit of U.S. Provisional Application No. 62/578,797, filed on Oct. 30, 2017. The entire disclosures of the above applications are incorporated herein by reference.

FIELD

The present invention relates to adjustable orbital devices including, but not limited to, polishers, buffers, sanders, and massagers.

BACKGROUND

The present invention relates to a method and apparatus for adjusting the stroke on a random orbital machine, such as, but not limited to, polishing machines, sanding machines, and massaging machines. This adjustment ability allows a user to define the stroke of the random orbital machine and adjust it between a maximum definitive stroke setting and minimum zero orbital or rotary setting.

Polishing machines and sanding machines are routinely used in the automotive detailing industry and home building industry to correct imperfections in the paint or drywall and to apply polishes and waxes. There are three primary machines used, including rotary buffers, random orbital machines, and dual action machines. Each tool has its place, as the manner in which the pad spins on each machine is unique and used for different purposes.

Rotary buffers are the fastest and most effective machine for removing paint defects in a controlled manner with good results. The drive unit used in a rotary buffer is directly connected to the pad and each one is in axial alignment with each other. In order to correct paint scratches, the rotary buffer is commonly used to remove enough paint surrounding the scratches to make the surface level. Removing scratches, however, requires more skill and control of the machine than a typical hobbyist possesses. For this reason, rotary buffers are commonly avoided by average users as it is very easy to remove too much paint and damage the finish by causing swirl marks or by burning the paint.

Random orbital machines were introduced in order to meet the needs of an average user, as they require less experience and control to operate. A random orbital machine uses a gear case that employs two unique mechanisms that move a pad attached to a backing plate. Unlike a rotary buffer, random orbital machines place the central rotational axis of the pad and the backing plate offset from the driveshaft of the machine. This offset is commonly referred to as the "stroke". As a result, the backing plate and pad orbit the driveshaft in a circular motion. At the same time, the pad randomly spins, as it is mounted on an idle bearing. This random spinning varies with pressure applied on the pad and is not directly powered. The result is a polishing action that will not burn or cut through the paint as it will not produce the heat from a powered spinning action. Random orbital machines are, therefore, much safer and dramatically less likely to cause swirls or burn through the paint.

Similar to random orbital machines, dual action machines place the central rotational axis of the pad and the backing plate offset from the driveshaft. As a result of this stroke, the backing plate and pad orbit the driveshaft in a circular motion. However, with a dual action machine the spinning of the pad is directly powered.

At the heart of a random orbital machine is the machine's stroke. The stroke is determined by the offset between the driveshaft axis and the backing axis. A longer offset or stroke places the backing plate rotational axis farther away from the driveshaft axis. Multiplying the offset by two produces the stroke diameter. The "stroke" is, therefore, a term that identifies the diameter of the path the backing plate travels as it orbits around the driveshaft.

A majority of random orbital machines are small stroke machines, which mean they use a stroke length that measures somewhere between approximately 6 mm-12 mm. A small stroke machine limits the movement of the pad to a smaller and tighter orbit. This results in a smoother action. A small stroke machine is also easier to control because the backing plate orbits around the driveshaft rotational axis in a tighter path. There are less vibrations and movement making the machine easier to hold due to the smoother action.

A large stroke machine delivers increased orbits per minute (OPM) of backing plate motion using the same rotations per minute (RPM), as the orbit of the backing plate and the pad around the drive shaft is increased. A large stroke also increases movement of the pad which helps spread out polishing compounds and treats a larger surface area. It also accomplishes more cutting action into the paint which allows for scratches and paint defects to be corrected. Small stroke machines typically only polish the paint and do not cut into it, and, therefore, are not able to remove surface defects.

One method of addressing the deficiencies of a small stroke has been to increase the RPM of the machine. While this increases the rotation of the motor, the machine stroke stays the same. There are also longevity issues associated with increased RPM for the motor and increased OPM for the pad. Increasing the RPM puts more strain on the motor, while increased OPM burns out a pad faster.

In sum, both long stroke and short stroke machines have their place in the industry. Therefore, what is needed is a machine that can be adjusted by the user without special tools or disassembly of the machine. Finally, what is needed is a compact, simple, and effective method to adjust the stroke of a machine based on the needs of the user.

SUMMARY

According to the disclosure, an adjustable stroke mechanism for a random orbital machine comprises a housing having a central axis and a wall enclosing a cavity. At least one counterweight is movably disposed within the cavity. A mounting assembly is disposed within the cavity. The mounting assembly includes a workpiece attachment mechanism. A stroke adjustor couples the at least one counterweight with the mounting assembly. The stroke adjustor enables the counterweight and mounting assembly to move with respect to one another such that a distance between the counterweight and the mounting assembly is variable adjusted. This also provides both a static and dynamic balancing of the stroke adjustor. Accordingly, this variable adjustable the stroke radius of the workpiece attachment mechanism with respect to the central axis of the housing. The stroke adjustor includes an adjusting ring and a cam mechanism. The adjustor ring surrounds the wall of the housing. The adjustor ring is axially movable along the central axis. Additionally, the adjustor ring is rotatable around the central axis. The counterweight engages the cam mechanism to move the counterweight in response to adjustor ring movement. The mounting assembly, including a bearing carriage, engages the cam mechanism to move the mounting assembly in response to adjustor ring movement. The workpiece attachment mechanism further comprises a bearing axle. The bearing axle extends through the housing through a bearing carriage and into the counterweight. At least one bearing surrounds the bearing axle and the at least one bearing is disposed within the orifice of the bearing carriage. A locking plate mechanism is associated with the cam mechanism. The locking mechanism locks the workpiece attachment mechanism in position. The cam mechanism further comprises at least one tab. The at least one tab engages a slot in a hub for locking the stroke adjustor in position.

According to a second embodiment, a method of adjusting a stroke of a random orbital machine comprises coupling an adjustable stroke mechanism. It includes, according to the disclosure, an adjustable stroke mechanism for a random orbital machine comprises a housing having a central axis and a wall enclosing a cavity. At least one counterweight is movably disposed within the cavity. A mounting assembly is disposed within the cavity. The mounting assembly includes a workpiece attachment mechanism. A stroke adjustor couples the at least one counterweight with the mounting assembly. The stroke adjustor enables the counterweight and mounting assembly to move with respect to one another such that a distance between the counterweight and the mounting assembly is variable adjusted. This also provides both static and dynamic balancing of the stroke adjustor. Accordingly, this variably adjusts the stroke radius of the workpiece attachment mechanism with respect to the central axis of the housing. The stroke adjustor is axially moved with respect to the central axis of the housing. The stroke adjustor rotates about the central axis of the axis. The counterweight and mounting assembly move with respect to one another. A distance between the counterweight and the mounting assembly is variably adjusted. A stroke radius of the workpiece attachment mechanism is variably adjusted with respect to the central axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a partial cross-section view of the stroke adjustor mounted on the tool in a non-engaged condition.

DETAILED DESCRIPTION

Figure 1:
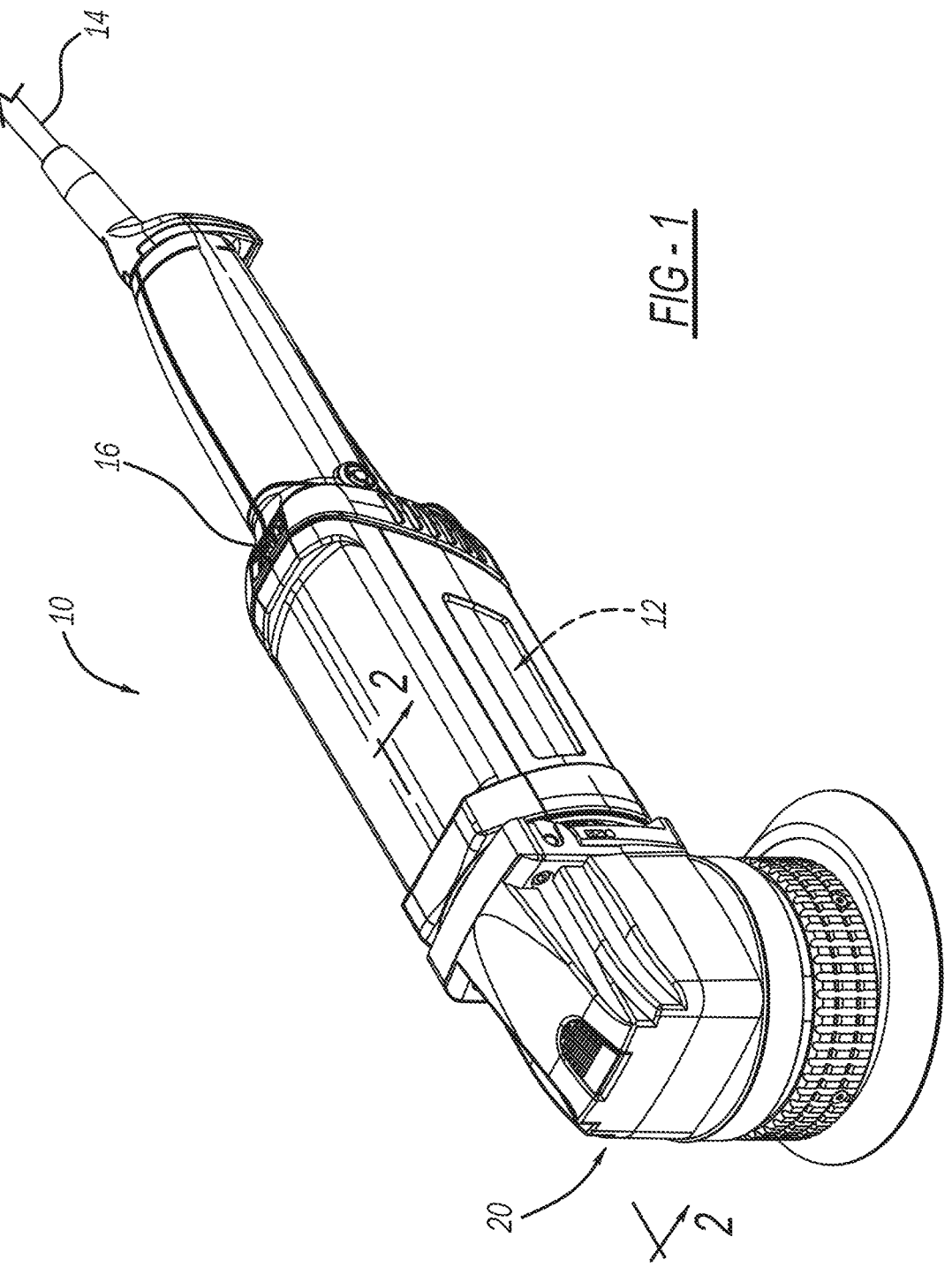
FIG. 1 is a perspective view of tool.
Figure 2:
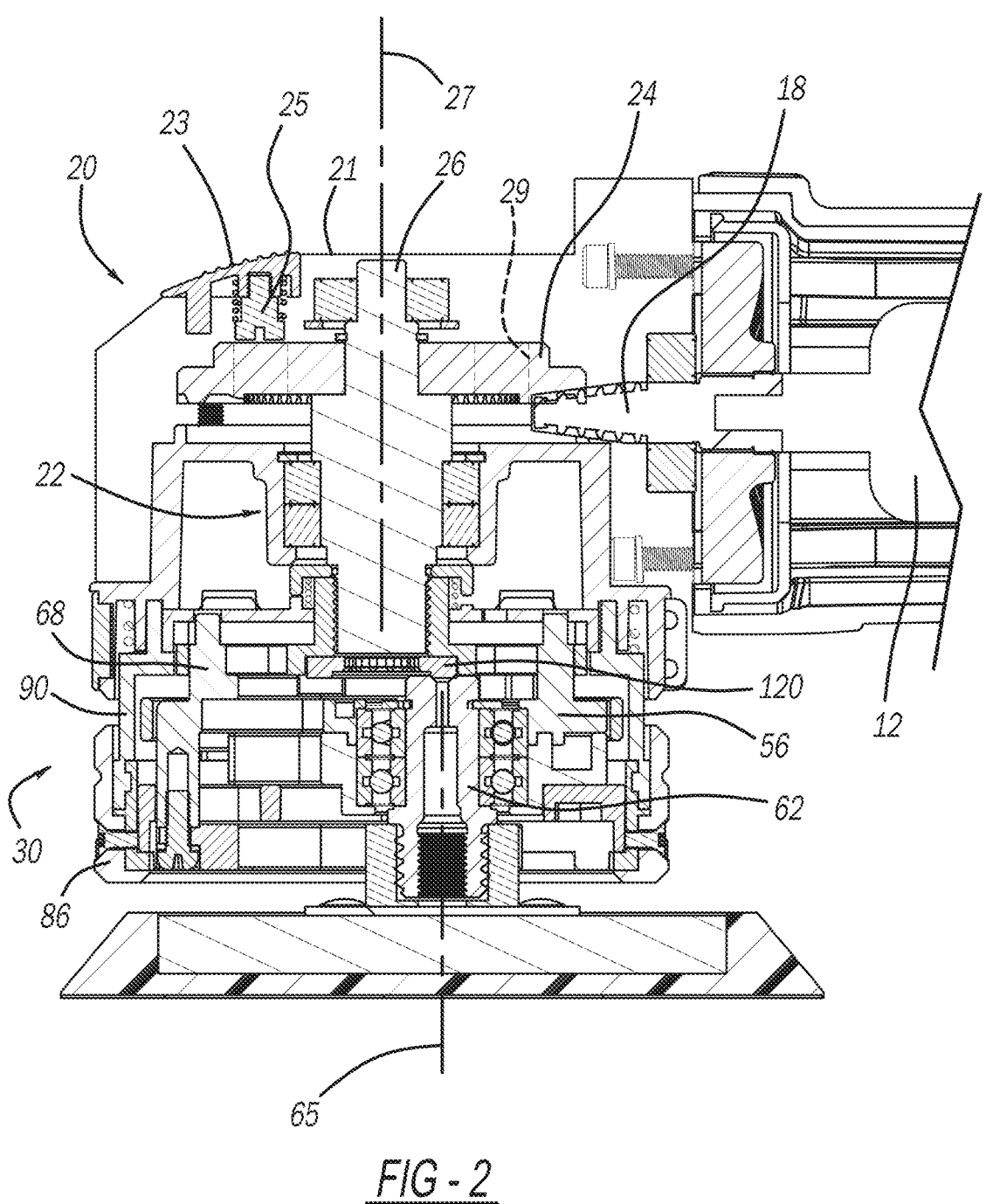
FIG. 2 is a cross-section view of FIG. 1 along line 2-2.
Figure 3:
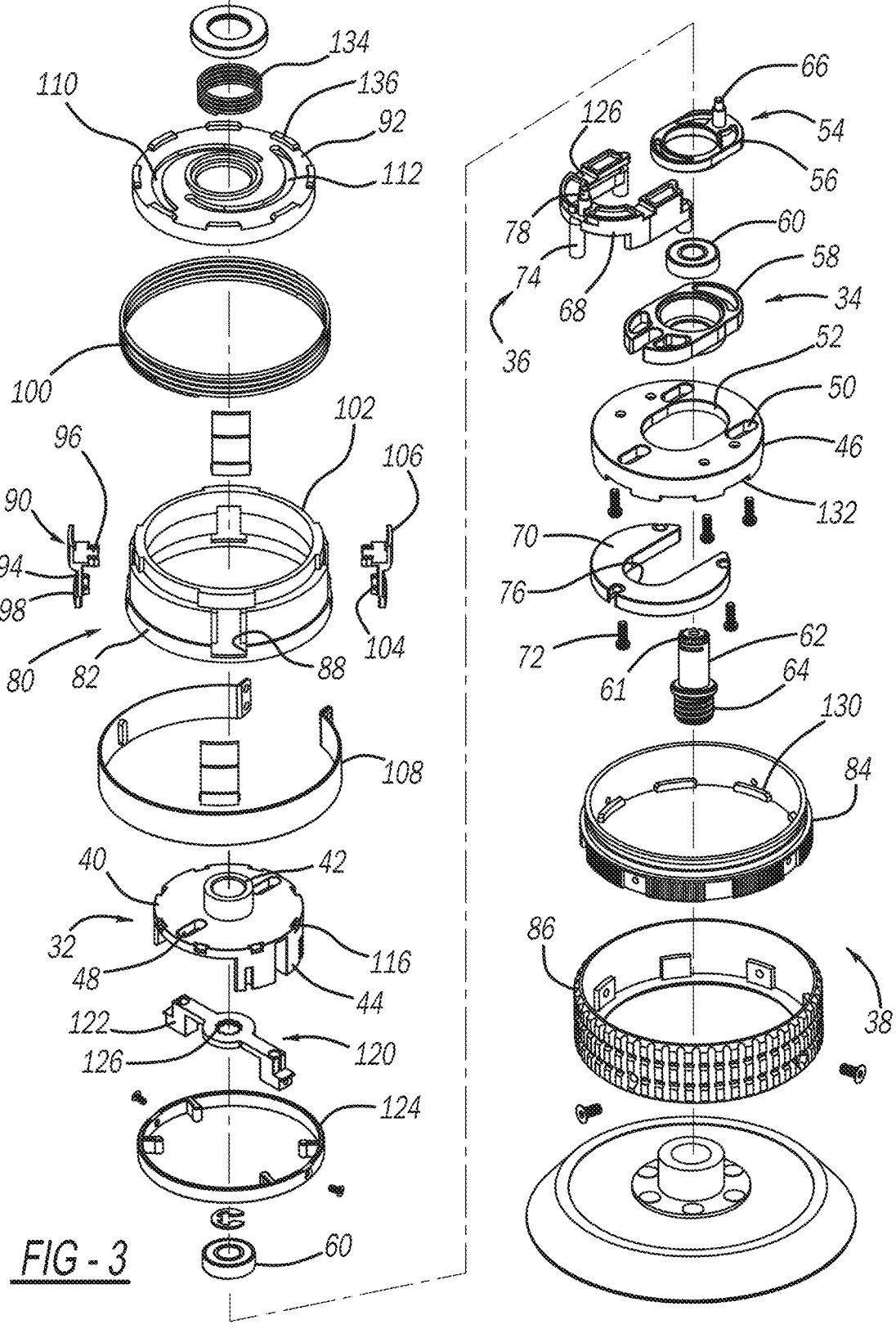
FIG. 3 is an exploded view of the stroke adjustor of FIG. 1.
Figure 4:
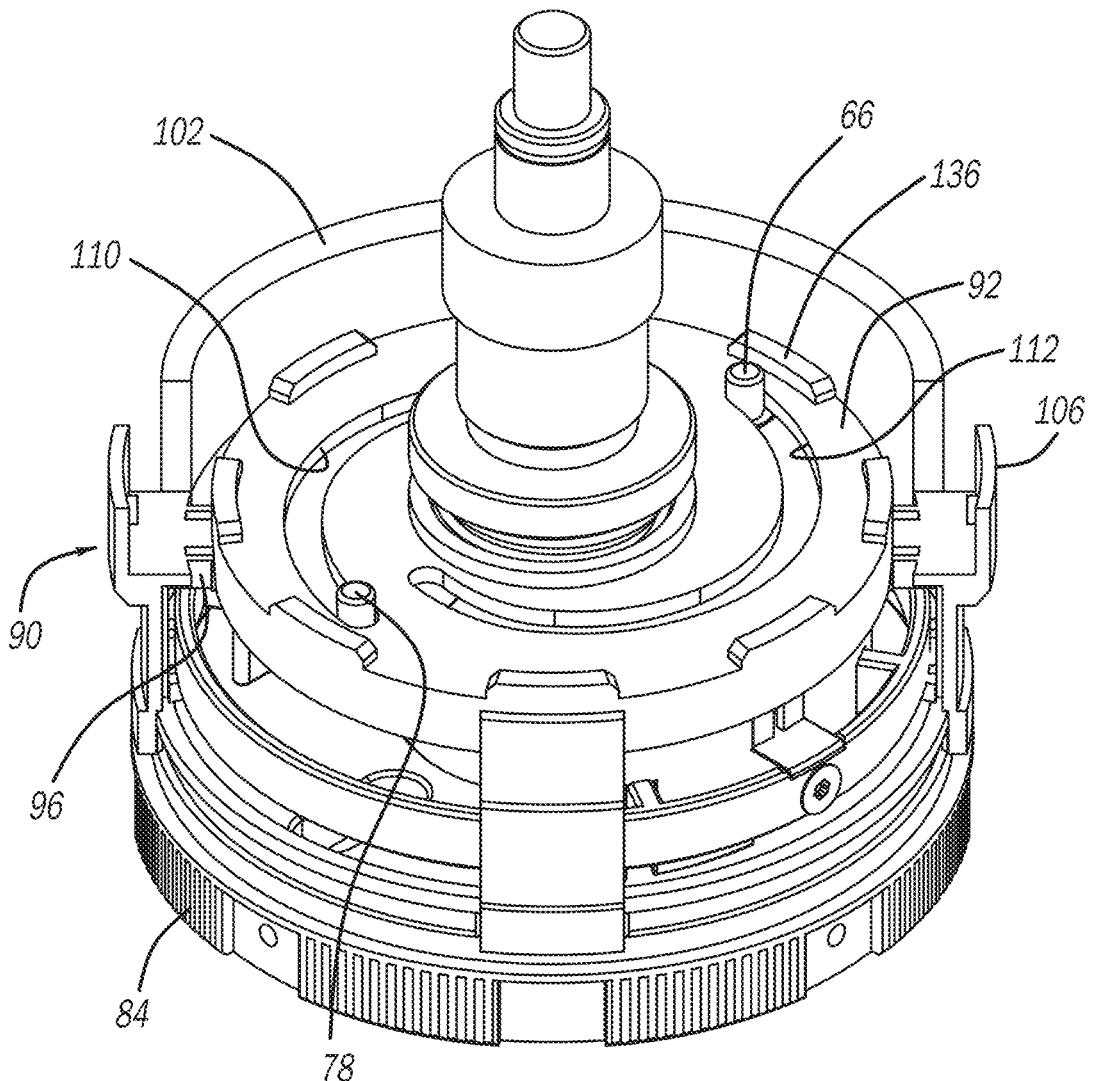
FIG. 4 is a partial perspective view of the stroke adjustor.
Figure 6:
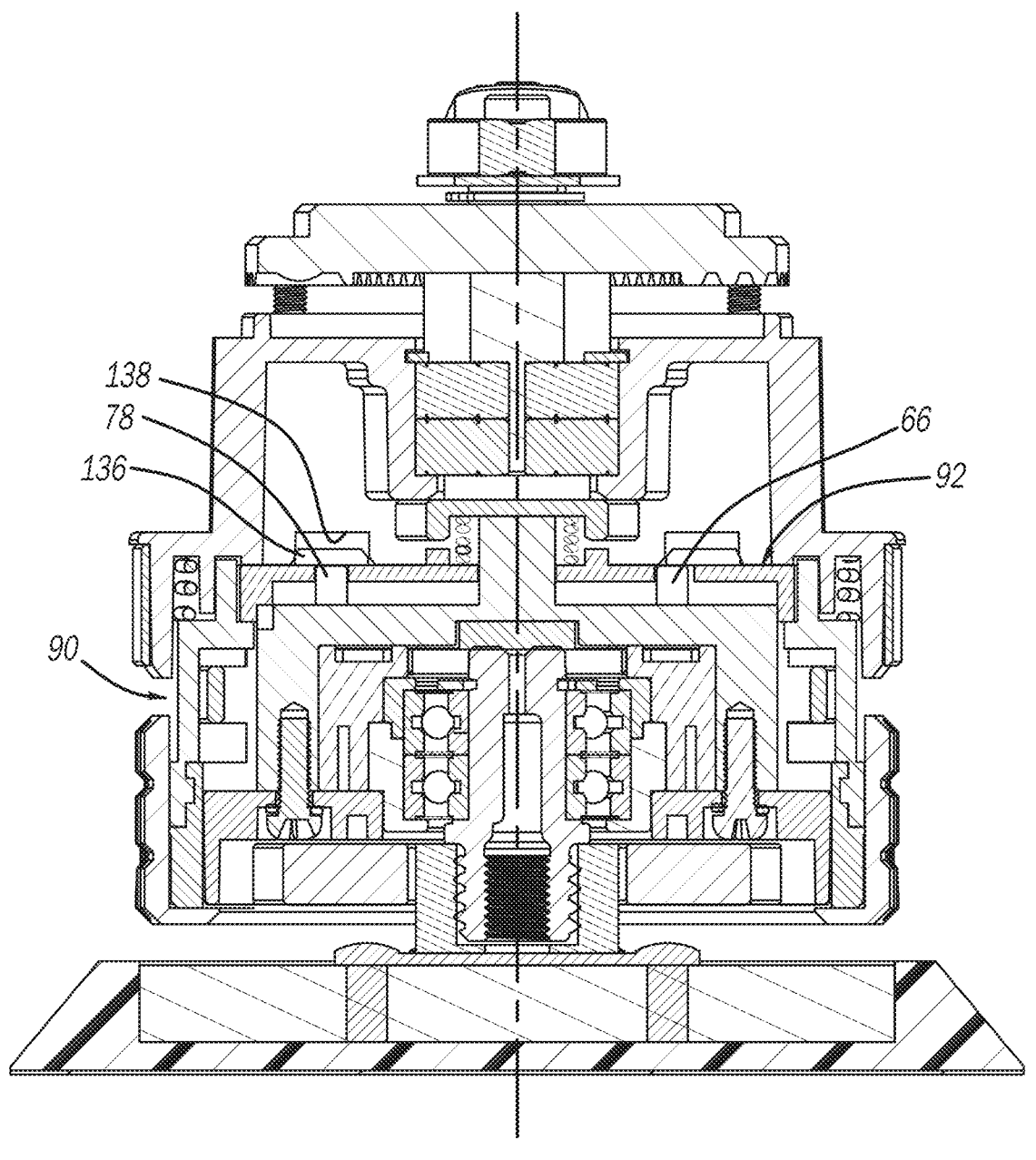
FIG. 6 is a view like FIG. 5 with the stroke adjustor in an engaged condition.
Figure 7:
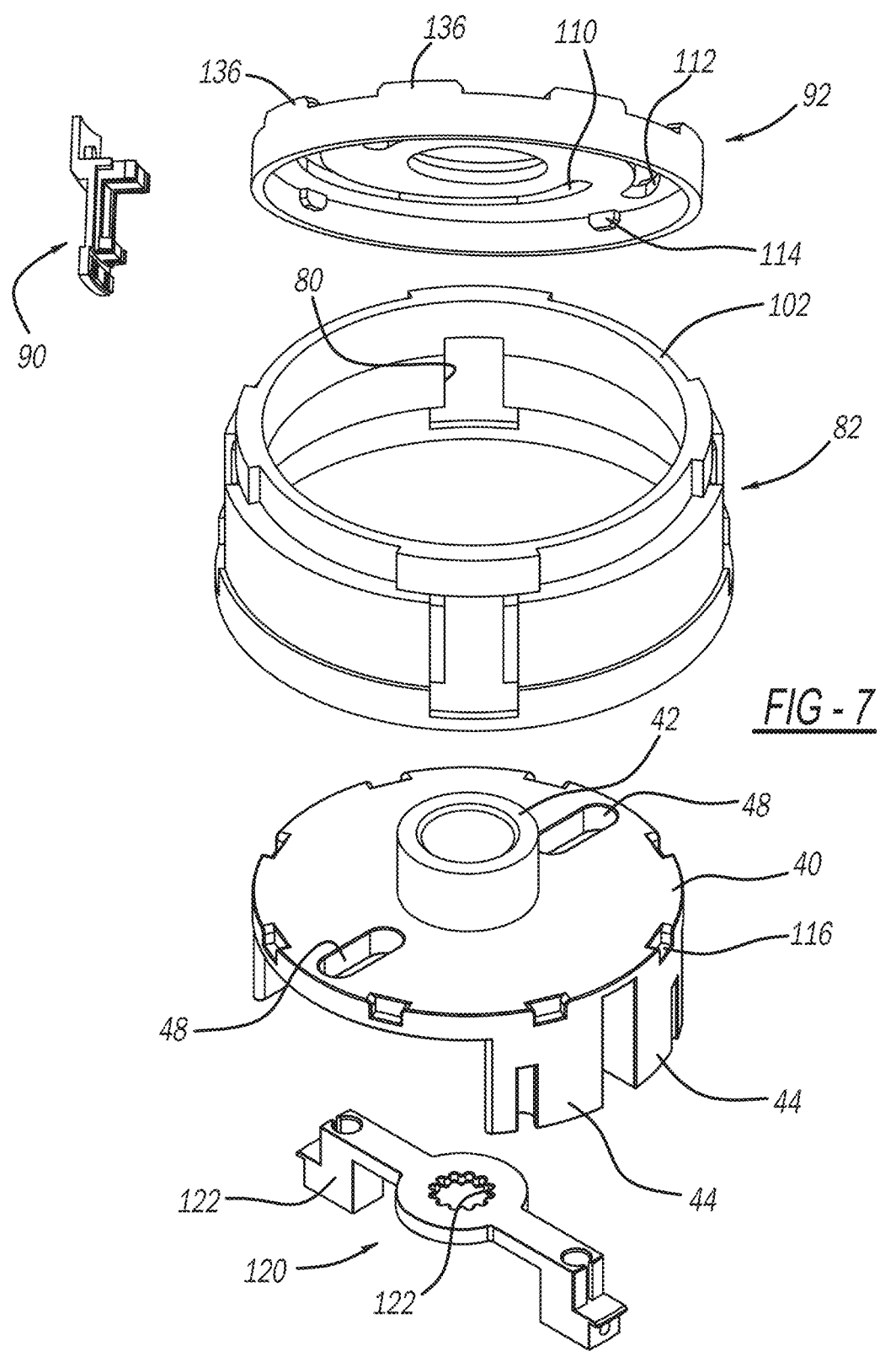
FIG. 7 is a partial exploded perspective view of the stroke adjustor.

Example embodiments will now be described more fully with reference to the accompanying drawings.

Turning to the figures, a tool is illustrated with an adjustable stroke device and is designated with the reference numeral 10. The tool 10 includes a motor 12, a power source 14 and a switch 16 for activating and deactivating the power source. The power source is shown as a cord but could be a rechargeable battery. The motor includes a pinion 18 that is positioned inside of a head housing 20 of the tool. The head housing 20 includes a cavity to house a drivetrain 22. The drivetrain 22 includes a gear 24 meshing with the pinion 18 and a rotatable spindle 26. The head housing has a spindle housing 31 and cover 21. The cover 21 includes a push button 23. A pin 25 is attached to the push button 23. The pin 25 engages bores 29 in the gear 24 to lock the rotation of the drive train 22. The stroke adjustor 30 is rotatably coupled with the spindle 26 and is mounted with the bottom of the head housing 20.

The stroke adjustor 30 includes a drive hub 32, a workpiece mounting assembly 34 and a counterbalance mechanism 36 and a stroke adjustment mechanism 38. The drive hub 32 includes a drive hub body 40 with a nipple 42 as well as extending legs 44. The nipple 42 extends from one side of the drive hub body 40 while the legs 44 extend from the other. The nipple 42 is threaded to receive the spindle 26. A hub plate 46 is attached to the legs 44 by threaded fasteners. The drive hub body 40 includes a plurality of slots 48 that couple with the counterweight mechanism 36 and workpiece mounting assembly 34 as will be explained later. Additionally, the hub plate 46 includes a plurality of slots 50 that couple with the counterweight mechanism 36. Also, the hub plate 46 includes an aperture 52, with an elliptical shape, that receives a portion of the workpiece mounting assembly 34. Thus, rotation of the spindle 26 is applied to the drive hub 32 to drive the stroke adjustor 30.

The workpiece mounting assembly 34 includes a carriage 54. The carriage includes a first carriage block 56 and a second carriage block 58. The carriage blocks 56, 58 include bores to receive bearings 60. A spindle 62 is passed through the bearings 60 and held by the carriage 54. The spindle 62 is rotatable in the bearings 60. Also, the spindle 62 includes a threaded tip 64 that enables a workpiece, such as a pad or the like, to be attached to the spindle 62. The spindle 62 passes through the aperture 52 in the hub plate 46. The first carriage block 56 includes a post 66 that passes through the slot 48 in the drive hub body 40. The post 66 is coupled with the stroke adjustment mechanism 38 as will be explained later.

The counterweight mechanism 36 includes a frame 68 and a counterweight ring 70. The counterweight ring 70 is secured to the frame 68 via fasteners 72. Both the frame 68 and counterweight ring 70 have an overall U-shape. The frame 68 includes a plurality of posts 74 that pass through the channels 50 in the hub plate 46. Thus, the counterweight ring 70 is attached to the underside of the hub plate 46. Also, the counterweight ring 70 includes a slot or channel 76 that enables the spindle 62 to pass through the channel 76. The counterweight frame 68 also includes a post 78. The post 78 passes through the slot 48 in the drive hub body 40.

The stroke adjustment mechanism 38 includes a cam 92 and housing 80 surrounding the drive hub 32, workpiece mounting assembly 34 and counterweight mechanism 36.

The housing 80 includes a sleeve 82, ring 84 and grip 86. The grip 86 is connected with the ring 84 which, in turn, is coupled with the sleeve 82, all of which are cylindrical and enable the stroke adjustment mechanism 38 to be moved axially along the spindle axis 27 as well as rotatable about the axis of the spindle 26.

The sleeve 82 includes a plurality of slots 88 that receive tabs 90. The tabs 90 contact the cam 92. The tabs 90 have a stepped shape body 94. The tread 96 is positioned underneath the cam 92. This enables the tabs 90 to push the cam 92 away from the hub plate 46 into engagement with the spindle housing 31. Underneath the tread 96 is a channel 98. The channel 98 receives a coil of the spring 100 to position the spring 100 and the tabs 90 with respect to the sleeve 82. The sleeve 82 includes a reduced circumferential portion 102 that receives the spring 100. The tread 96 of tab 90 includes a ledge 104 that is received within the ring 84. Also, the tab 90 includes a projection portion 106 that slides in a slot in the head housing 20. A C ring 108 is attached with the head housing 20 covering the tab projections 106 to retain the adjustable stroke mechanism onto the head housing 20.

The cam 92 includes a pair of arcuate slots 110, 112. Slot 110 receives the workpiece mounting assembly post 66 and the arcuate slot 112 receives the counterweight frame post 78. As the drive hub 32 is rotated by the stroke adjustment mechanism 38, the post 78, 66 move the counterweight 36 and workpiece mounting assembly 34 with respect to one another. This movement moves the axis 65 of the spindle 62 toward or away from the central axis 27 of spindle 26. This movement also provides both static and dynamic balancing of the stroke adjustor.

The underside of the cam 92 includes a plurality of tabs 114. The tabs 114 position into slots 116 on the drive hub body 40. Thus, depending upon the position of the spindle 62 with respect to the central axis 27, the tabs 114 will be in different hub slots 116 to enable variable positioning of the spindle 62 with respect to the central axis 27.

An axle lock bridge 120 is positioned adjacent to the drive hub 32. The axle lock bridge 120 includes legs 122 that slide in slots between the drive hub legs 44. Thus, the axle lock bridge 120 is positioned between the legs 44. A ring 124 encircles the hub 40. The ring 124 includes apertures that enable fasteners to pass through the ring to position the axle lock bridge on the drive hub 32. The axle lock bridge 120 includes an aperture 126 to receive the top 61 of the spindle 62. When the workpiece mounting assembly spindle 62 is aligned coaxially with the drive spindle 26, the axle lock bridge aperture 126 receives the top 61 of the spindle 62 to lock the spindle 62 in a coaxial position. This provides a zero orbital or rotary position for the stroke adjustor 30. Also, the axle lock bridge 120 is biased to rest in channels 126 in the counterweight frame 68.

The above adjustable stroke adjustor 30 functions as follows. The push button pin 25 engages a gear bore 29. The grip 86 is pushed towards the drive head housing 20. As this occurs, the spring 100 is compressed by the tabs 90. The tab treads 96 lift the cam 92 so that the cam tabs 114 disengage from the hub slots 116. The projections 136, on top of the cam 92, engage the slots 138 in the spindle housing 31. This secures the cam 92 in place.

The grip 86, connects with the ring 84 which, in turn, contacts with the drive hub 32. The ring projections 130 engage the slots 132 of the hub plate 46. As the grip 86 is rotated, the drive hub 32 is rotated. As this occurs, the posts 78, 66 in the cam arcuate slots 112, 110 are moved with respect to one another. As the posts 78, 66 move with respect to one another, the counterweight mechanism 36 as well as the workpiece mounting assembly 34 are moved with respect to one another so that the spindle 62 is moved with respect to the central axis 27 of the spindle 26. This variably adjust the stroke of the adjustable stroke adjustor 30. The stroke is adjusted between a true rotary position to a maximum orbital position.

Once the desired position is determined by the user, the user releases the grip 86. The cam spring 134 biases the cam 92 back into engagement with the hub body 40. The spring 100 biases the tabs 90 toward the hub plate 46. Thus, the cam tabs 114 re-engage the hub body slots 116 locking the counterweight mechanism 36 and workpiece mounting assembly 34 in position with respect to one another. Thus, activation of the switch 16 rotates the spindle 26 which, in turn, rotates the spindle 62 of the stroke adjustor 30. The counterweight mechanism 36, with the workpiece mounting assembly 34, balance, both statically and dynamically, the rotational imbalance due to the spindle 62 being offset from the central axis 27 of the spindle 26. Thus, the spindle 62 rotates the workpiece, in an orbital fashion, at a stroke away from the central axis 27.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adjustable stroke mechanism for a random orbital machine comprising:
   a housing having a central axis and a wall enclosing a cavity;
   at least one counterweight movably disposed within the cavity;
   a mounting assembly disposed within the cavity, the mounting assembly including a workpiece attachment mechanism;
   a stroke adjustor coupling the at least one counterweight with the mounting assembly, the stroke adjustor is rotatable around the central axis and axially movable enabling the counterweight and mounting assembly to move with respect to one another such that a distance between the counterweight and the mounting assembly is variably adjusted which, in turn, variably adjusts a stroke radius of the workpiece attachment mechanism with respect to the central axis of the housing.

2. The adjustable stroke mechanism of claim 1, wherein the stroke adjustor includes an adjustor ring surrounding the wall of the housing, the adjustor ring is axially movable along the central axis and is rotatable around the central axis.

3. The adjustable stroke mechanism of claim 1, wherein the counterweight engages the element moving the counterweight in response to movement.

4. The adjustable stroke mechanism of claim 1, wherein the mounting assembly including a bearing carriage engaging the element for moving the mounting assembly in response to movement.

5. The adjustable stroke mechanism of claim 1, the workpiece attachment mechanism further comprising a spindle, the spindle extending through the housing, through a bearing carriage, and into the counterweight.

6. The adjustable stroke mechanism of claim 5, further comprising at least one bearing surrounding the spindle and the at least one bearing disposed within an orifice of the bearing carriage.

7. The adjustable stroke mechanism of claim 1, further comprising a locking mechanism associated with the element to lock the workpiece attachment mechanism.

8. The adjustable stroke mechanism of claim 7, wherein the element further comprises at least one tab, the tab engaging a slot in a hub for locking the stroke adjustor.

9. A method of adjusting a stroke of a random orbital machine comprising:

coupling an adjustable stroke mechanism to a random orbital machine, the adjustable stroke mechanism comprising:

a housing having a central axis and a wall enclosing a cavity;

at least one counterweight movably disposed within the housing;

a backing plate mount assembly disposed within the housing; the backing plate mount assembly including a mechanism for attaching to a workpiece;

a stroke adjustor coupling the at least one counterweight with the mounting assembly, the stroke adjustor is rotatable around the central axis and axially movable;

adjusting the stroke adjustor;

moving the counterweight and mounting assembly with respect to one another;

variably adjusting a distance between the counterweight and the mounting assembly; and variably adjusting a stroke radius of the mechanism to attach the workpiece with respect to the central axis of the housing.

10. A random orbital machine comprising:

a motor, a power source and a switch for activating and deactivating the power source;

a housing having a central axis and a wall enclosing a cavity;

at least one counterweight movably disposed within the cavity;

a mounting assembly disposed within the cavity, the mounting assembly including a workpiece attachment mechanism;

a stroke adjustor coupling the at least one counterweight with the mounting assembly, the stroke adjustor is rotatable around the central axis and axially movable, the stroke adjustor enabling the counterweight and mounting assembly to move with respect to one another such that a distance between the counterweight and the mounting assembly is variably adjusted which, in turn, variably adjusts a stroke radius of the workpiece attachment mechanism with respect to the central axis of the housing.

* * * * *